Figure 1:
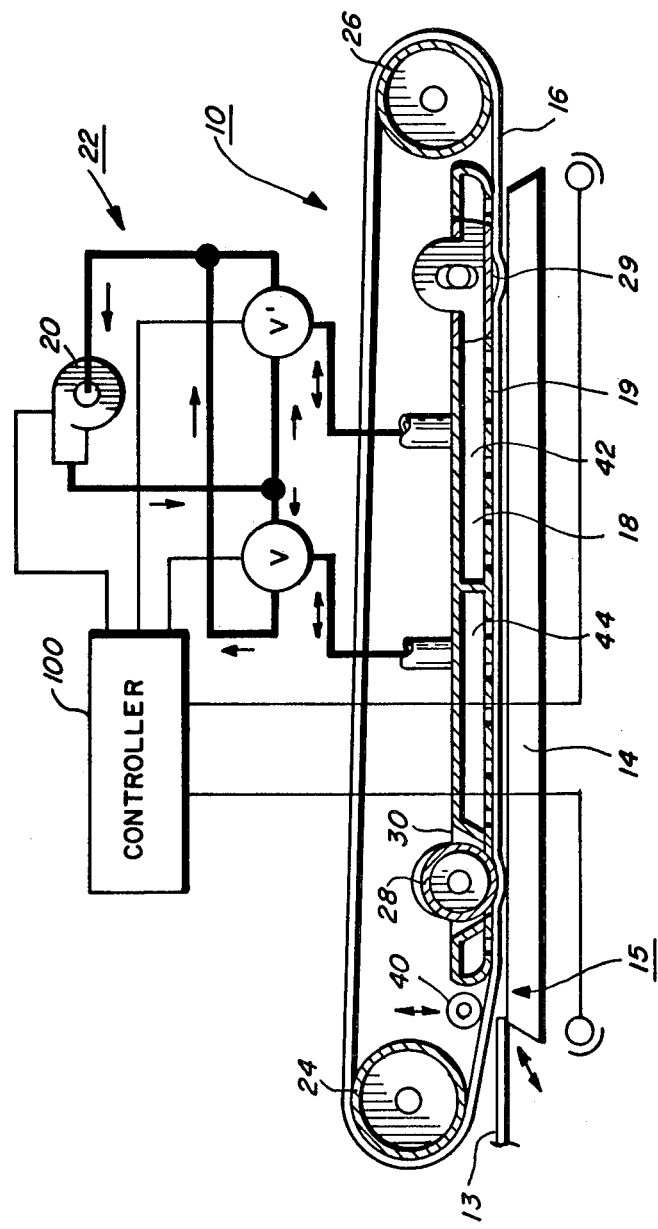

United States Patent [19]

Howard

[11] 4,440,492

[45] Apr. 3, 1984

[54] VARIABLE FORCE WIDE DOCUMENT BELT TRANSPORT SYSTEM

[75] Inventor: Anthony Howard, Rochester, N.Y.

[73] Assignee: Xerox Corporation, Stamford, Conn.

[21] Appl. No.: 414,713

[22] Filed: Sep. 3, 1982

[51] Int. Cl.³ .................. G03B 27/62; G03B 27/64
[52] U.S. Cl. ........................................ 355/76; 271/6; 271/10; 271/233; 271/275
[58] Field of Search ................ 355/76, 3 SH, 14 SH; 271/6, 10, 233, 275; 428/494; 226/97

[56] References Cited

U.S. PATENT DOCUMENTS

| | | | |
|---|---|---|---|
| 3,087,664 | 4/1963 | Streeter | 226/97 |
| 3,504,908 | 4/1970 | Krueger | 271/10 |
| 3,937,454 | 2/1976 | Colwill | 271/6 |
| 4,043,665 | 8/1923 | Caldwell | 355/76 |
| 4,076,233 | 2/1978 | Knight et al. | 271/233 |
| 4,286,870 | 9/1981 | Silverberg | 355/76 |
| 4,298,277 | 11/1981 | Silverberg | 355/76 |
| 4,314,006 | 2/1982 | Lentz et al. | 428/494 |
| 4,353,541 | 10/1982 | Parzygnat | 271/275 |
| 4,362,380 | 12/1982 | Dragstedt | 355/3 SH |

FOREIGN PATENT DOCUMENTS 51-120717 10/1976 Japan.

OTHER PUBLICATIONS

"Belt Energized Antiskew Rolls", Victor Castro-Hahn, *Xerox Disclosure Journal*, vol. 6, No. 6, Nov./Dec. 1981, p. 345.

*Primary Examiner*—Richard A. Wintercorn

[57] ABSTRACT

A document transport for transporting document sheets over a copier platen and into a registration position thereon for copying with a single light reflective, flexible, unapertured and air impervious wide frictional movable belt providing a uniform light imaging background for the document sheet, having a selectably actuatable vacuum system for selectably applying a vacuum to a vacuum plenum overlying the vacuum belt above the platen, for lifting all but selected minor areas of the belt away from the platen and document toward the vacuum plenum when a vacuum is applied, but and for allowing the belt to drop into planar engagement with a document sheet on the platen over a much larger area of said belt when the vacuum is removed, and belt deforming rollers deforming the selected minor areas of the belt away from the vacuum plenum towards the platen for selective area driving of a document sheet on the platen with these deformed minor areas or protuberances of the belt when the vacuum is applied.

14 Claims, 2 Drawing Figures

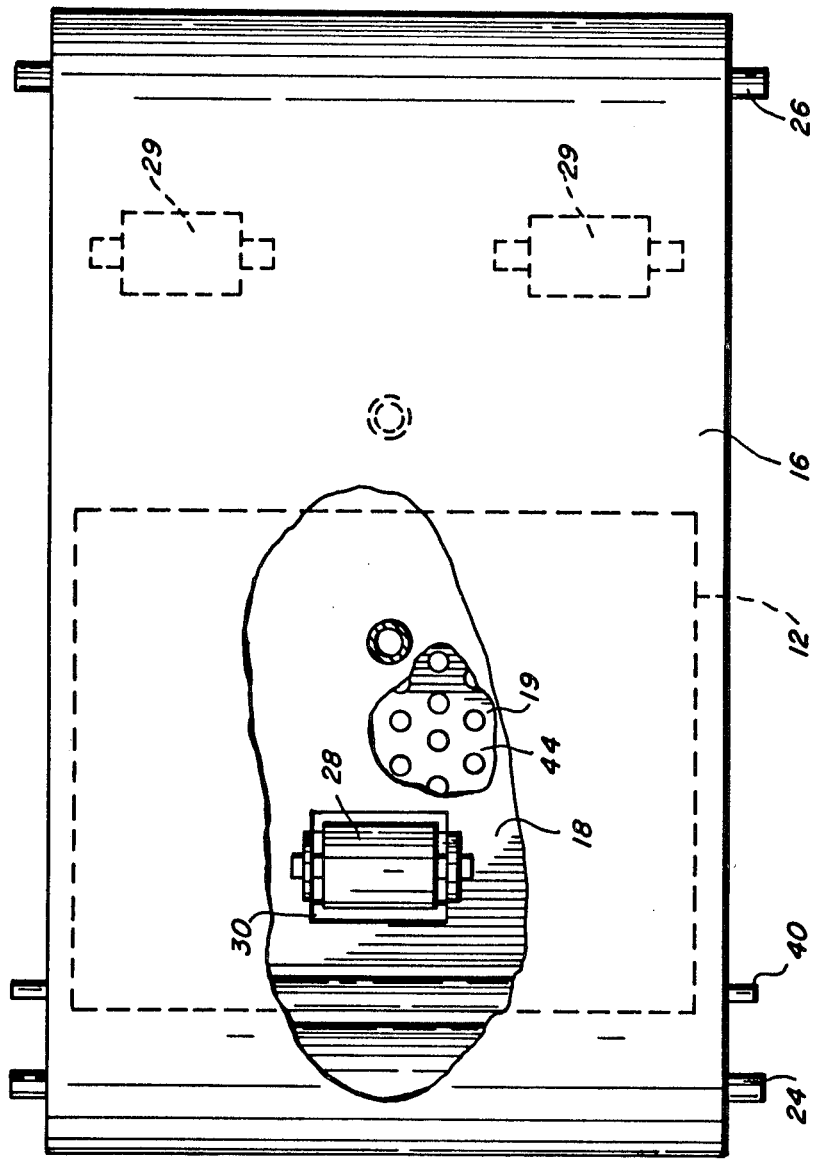

VARIABLE FORCE WIDE DOCUMENT BELT TRANSPORT SYSTEM

The present invention relates to a document handling system and more particularly relates to an improved method and apparatus for automatically transporting, registering and deskewing individual document sheets to be copied on a copier platen with a wide unapertured transport belt having a variable vacuum controlled normal force.

As xerographic and other copiers increase in speed, and become more automatic, it is increasingly important to provide higher speed yet more reliable and more automatic handling of the original document sheets being copied, i.e. the input to the copier. It is desirable to feed, register and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semi-automatic document handling, allowing an operator to "stream feed" originals into an input of the copier document handler, with the document handler doing the deskewing, final registration and feeding of the documents into and through the copying position, and then ejecting the documents automatically. However, for compact and low cost copiers, an appropriate document handler must also be simple, low cost and compact.

A preferable document handling system is one that utilizes an existing or generally conventional copier optical imaging system, including the external transparent copying window (known as the platen) of the copier. It is also desirable that the document handling system be readily removable, as by pivoting away, to alternatively allow the copier operator to conventionally, manually place documents, including books, on the same copying platen. Thus, a lighter weight document handler is desirable. It is also desirable for the same registration edge or position to be available for such manual copying as is used for the document handler.

In the description herein the term "document" or "sheet" refers to a conventional flimsy sheet of paper, plastic, or other conventional or typical individual image substrate (original or previous copy), and the like, and not to microfilm or electronic image originals, which are generally much easier to manipulate. However, the terms "copier" or "copying" here are intended to encompass electronic document reading devices which record or transmit the information read from the document in electronic or other form not limited to copy sheets.

Although faster and more accurate automatic registration of the individual original document sheets at the correct position on the platen to be copied is desired, it is difficult to accomplish without skewing (slightly rotating) the document and/or damaging the edge of the document being stopped. Document sheets can vary widely in sheet size, weight, thickness, material, condition, humidity, age, etc.. Documents may have curls, wrinkles, tears, "dog-ears", cut-outs, overlays, paste-ups, tape, staples, adhesive areas, or other irregularities. Unlike copy sheets, which generally are all from the same batch and cut from the same paper reams, and therefore of almost exactly the same condition and size, original document sheets often vary considerably even if they are all of the same "standard" size, (e.g. letter size, legal size, A-4, B-4, etc.) because they have come from different paper batches or have variably changed size with different age or humidity conditions, etc.. Yet it is desirable to automatically or semi-automatically rapidly feed, register and copy a set of individual documents with a mixture of sizes, types, and conditions without document jams or document damage and with each document correctly and accurately aligned to the registration position.

One of the most difficult to achieve requirements for automatic document handling is the accurate and reliable, but safe, registration of the original document at the proper position for copying. Conventionally the document is desirably automatically either center registered or corner registered (depending on the copier) by the document handler at a pre-set registration position relative to the copier platen, with two orthogonal edges of the document precisely aligned with two registration lines of the copier platen i.e. with the original document aligned with the copier optics and copy sheet registration system. This registration accuracy is desirably consistently within less than 1 millimeter. If the document is not properly registered, then undesirable dark borders and/or edge shadow images may appear on the ensuing copy, or information near an edge of the document may be lost, i.e. not copied onto the copy sheet. Skewing can also affect proper restacking of the documents.

As shown in the cited art, document handling systems have been provided with various document transports to move the original document sheets over the copier platen and into and out of registration. Various combinations of such transports are known with various registration devices or systems. It is known in the art to register the original document for copying at the appropriate position relative to the transparent copying window in various ways. Typically the document sheet is registered by driving it against a gate or stop at or adjacent one edge of the platen. This may comprise projecting aligned fingers, or roller nips, or a single vertical surface, against which an edge of the sheet is driven into abutment to register the sheet. An important function of such registration is to also deskew the moving original document, i.e., to properly rotate and align it with the registration line as well as to determine and control its registration position.

As indicated, it is conventional to provide either fixed or retractable registration finger or gate document stopping edges aligned along the one edge of the platen, so as to physically register the document in its copying position. This also reduces transport criticality, i.e. allows slip or skewing of the document feeder to be accommodated and corrected. The document transport can be designed to slip briefly relative to the document lead edge striking the registration edge stop until positive deskewing and full registration are achieved. However, the same platen transport sheet feeder is preferably used to drive a document onto and off of the platen before and after copying as well as registering the lead edge of the document at the downstream platen edge. Registering the trail edge of the document by reversing the feeder and backing the document into a fixed registration edge at the upstream edge of the platen may be alternatively provided. In some document handling systems a system for also side registering or laterally positioning the document on the platen is used, i.e. positioning of the original on two axes on the platen. However this is not required, and lateral registration may be done upstream of the platen.

A severe limitation on such frictional over-platen document sheet transport and registering systems is that they must have sufficient drive force to reliably feed the document sheet, but must slip relative to the platen glass when no document sheet is therebetween without scratching or wearing the glass such that imaging through the glass is affected. As indicated above, the document transport normally needs to also slip relative to the document when the document is stopped by the registration edge stop. Further, the overplaten transport should minimize "show around" problems-i.e. undesirable dark areas or images on the copy sheet, especially for undersized documents, by visible portions of the transport extending beyond the document edges during copying. This has led to the use of single large white elastomeric belts for many document handlers in lieu of rollers or multiple belts. However such single belt systems have been found to have some inherent compromises in feeding and registration reliability. In particular, both the belt frictional characteristics and its normal force (the pressure of the belt against the document) are quite critical, and typically requires regular maintenance and adjustment. This is discussed, for example, in U.S. Pat. No. 4,353,541 issued Oct. 12, 1982 by William J. Parzygnat and the art therein, which includes solenoid actuated "kicker" or normal force belt loading rollers, such as that disclosed in Vol. 6, No. 6, Nov./Dec. 1981, p. 345 of the "Xerox Disclosure Journal". Single wide belt document handlers in a reversible belt trail edge registration system are shown, for example, in U.S. Pat. Nos. 3,504,908 issued Apr. 3, 1980 to J. R. Kruger, and 4,076,233 issued Feb. 28, 1978 to C. Knight, et al..

Examples of the peculiar or special requirements for platen transport belt material (compared to other belts) are disclosed in U.S. Pat. No. 4,314,006 issued Feb. 2, 1982 to James A. Lentz and Joseph H. Moriconi.

A particular such limitation or compromise is that a document transport system which minimizes the introduction of document sheet skewing in feeding from the document set stack up to the registration position on the platen, and in the return therefrom, is highly desirable, in order to reduce the amount of skew needing correction (deskewing) in the registration position. Yet it is also desirable, but normally incompatible, to maximize document skewing during the document registration, i.e. to allow the document to rotatably slip relative to the belt to be freely deskewed as it is driven into alignment with the registration edge. The present invention compatibly provides both of these features.

To overcome the skewing problem it is known to use an apertured vacuum belt. However, this creates problems in undesirable imaging of the belt apertures onto the copies, and/or difficulties in registering the document on the platen without a servo-driven belt drive and in providing any slip for deskewing the document. Noted, for example, are U.S. Pat. Nos. 4,298,277 and 4,286,870 to Morton Silverberg; 4,043,665 issued Aug. 23, 1977 to J. R. Caldwell, and Japanese Application Laid Open No. 51-120717 laid open Oct. 22, 1976 (FX/1176).

An air pressure bladder or mechanical clamp to flatten a document belt and underlying document against a platen during copying is also known, e.g. U.S. Pat. No. 3,937,454 issued Feb. 10, 1976 (Re. 29,178) by Richard E. Colwill.

The present invention may be utilized as part of a recirculating document handler as well as for an automatic or semi-automatic document handler. Some examples of further details of exemplary recirculating document handlers with on-platen registration document transport and deskewing for which the present invention may be substituted are disclosed in U.S. Pat. Nos. 4,335,954 issuing June 22, 1982 to Russell L. Phelps; 4,278,344 issued July 14, 1981 to R. B. Sahay; 4,270,746 issued June 2, 1981 to T. J. Hamlin and 4,076,408 issued Feb. 28, 1978 to M. G. Reid, et al..

In technologies or arts other than original document sheet platen transport and registration systems there are, of course, many other pneumatic belt or tape control systems per se. Examples include U.S. Pat. No. 3,087,664 issued Apr. 30, 1963 to D. N. Streeter.

Examples of various other patents teaching document handlers and also control systems therefor, including document path switches, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344 and 4,284,270. Simple software instructions in a copier's conventional microprocessor logic circuitry of document handler and copier control functions and logic, as taught by the above and other patents and various commercial copiers, are well known and preferred. Fixing of such software in read only memory (ROM) or programmable (PROM) hardware connected with or as part of the copier controller microprocessor is preferred. However, it will be appreciated that the document handling functions and controls described herein may be alternatively conventionally incorporated into a copier utilizing any other suitable or known logic circuits, switch controllers, etc.. Electrical control signals may be used to activate conventional motors, cams, solenoids, etc.. Software for functions described herein may vary depending on the particular microprocessor or microcomputer system utilized, of course, but will be already available to or readily programmable by those skilled in the art without experimentation from the descriptions provided herein.

All references cited herein, and their references, are incorporated by reference herein for appropriate teachings of additional or alternative details, features, and/or technical background.

The present invention desirably overcomes or reduces various of the above-discussed problems. A desirable feature of the document handling system disclosed herein is to provide a document transport for a copier platen which automatically provides a lighter driving force during registration of the original document sheet on the platen than the driving force on the document when the document is entering onto the platen, so as to provide reliable feeding yet reduce the chances of buckling or damaging the document during that portion of its transport in which it is being registered, thereby overcoming a tendency of many present document transport belt systems to provide either too much or too little document driving force for one or both of these different transport positions and conditions, yet without requiring a multiple belt or roller system with attendant show-through or show-around copy defect problems from imaged belt edge shadows or contamination.

A preferred feature disclosed herein is to provide, in a document transport for transporting document sheets over a copier platen and into a registration position thereon for copying with a single light reflective, flexible, unapertured and air impervious wide frictional movable belt providing a uniform light imaging background for the document sheet, the improvement comprising: selectably actuatable vacuum means for selectably applying a vacuum to vacuum plenum means overlying said vacuum belt above said platen, said vacuum means lifting all but selected minor areas of said belt away from said platen toward said vacuum plenum means when a vacuum is applied to said vacuum plenum means, said vacuum plenum means allowing said belt to drop from said vacuum plenum means into engagement with a document sheet on the platen over a much larger area of said belt when said vacuum is removed from said vacuum plenum means as compared to when said vacuum is applied to said vacuum plenum means, and belt deforming means for deforming said minor areas of said belt away from said vacuum plenum means towards said platen for selective area driving of a document sheet on the platen with said deformed minor areas of said belt when said vacuum is applied to said vacuum plenum means.

Further features which may be provided by the method and apparatus disclosed herein, individually or in combination, include those wherein said belt deforming means comprises rollers deformably engaging said selected minor areas of said belt for deforming said belt into driving engagement with a document sheet being transported across said platen while other areas of said belt are lifted out of engagement with the document sheet by said vacuum applied to said vacuum plenum means; wherein said vacuum plenum means and said belt are adapted to allow said belt to non-deformably planarly overly and engage a document sheet when said vacuum is removed from said vacuum plenum means; wherein said belt is lifted away from said platen by approximately 0.25 to 1 millimeter except in said selected minor areas when said vacuum is applied to said vacuum plenum means; wherein said belt is an endless loop with upper and lower flights and said vacuum plenum means comprises a fixed generally planar vacuum surface member mounted inside said endless loop and overlying said second flight; wherein said vacuum plenum means is apertured for said belt deforming means and said belt deforming means extend through said apertures; or further including pressure roller means engaging the belt in said registration position, wherein said vacuum plenum means has separate portions to which vacuum may be selectively applied; and further including means for selectively applying a positive pneumatic pressure instead of a vacuum to said vacuum plenum means.

Another disclosed feature is a method for transporting a document sheet over a copier platen with a single wide unapertured frictional belt providing a uniform light imaging background for the document sheet comprising the steps of: applying a vacuum lifting force over a substantial area of the back of said belt over said platen to deform said belt into a generally planar surface spaced from the document sheet with at least two belt protuberances extending towards said platen in selected minor areas of said belt, engaging and transporting the document sheet over the platen with said deformation protuberances of said belt, and then removing said vacuum to remove said deformation of said belt and allowing said belt to substantially planarly overly the document sheet and to greatly increase the area of contact between the belt and the document sheet.

Further disclosed features are wherein said belt is accelerated to eject the document sheet from the platen with said vacuum removed and then said vacuum is reapplied to said belt for the feeding of a subsequent document over the platen and said deformation protuberances are formed in said belt by applying mechanical pressure to the back of the belt in said selected minor areas with sufficient pressure to overcome said vacuum lifting force in said selected minor areas.

Various of the above-mentioned and further features and advantages will be apparent from the examples described hereinbelow of specific apparatus and steps of operation. The invention will be better understood by reference to the following description of one specific embodiment thereof including the following drawing figures (approximately to scale) wherein:

FIG. 1 is a side view of an embodiment of an exemplary document handling apparatus utilizing the document transport and registration system of the present invention; and FIG. 2 is a plan (top) view of the apparatus of FIG. 1.

The exemplary document sheet handling system disclosed in FIGS. 1 and 2 may be conventional except as otherwise described herein, and may be mounted to any suitable or conventional copier. Disclosed here as one example, but not limited thereto, is a semi-automatic document handler (SADH) unit 10. It is conventionally mounted over a conventional copier platen, preferably pivotably removable for alternative manual document placement on the platen. Alternatively, however this document handler 10 may be the platen transport portion of a recirculating document handler providing precollation copying. A document sheet 12 may be conventionally fed to the upstream end or entrance to the document handler 10, either manually, or automatically fed from a stack of document sheets, as is known in the art. The document handler 10 receives the document sheet 12 and is designed to transport it reliably into the platen registration position for registered imaging thereof by the copier. Registration here is illustrated by a conventional retractable registration edge stop 13 at the downstream edge of the copier platen 14. As previously discussed, the requirements for the transporting of the document into the platen registration area 15 are different from the desired feeding forces on the document both prior and subsequent thereto. In the platen registration area 15 the document transport must slip relative to the document sheet 12 to prevent buckling or overdriving of the lead edge of the document sheet against the fingers or gates of the registration edge stop 13. Also it is desirable to allow the document sheet to skew slightly during this final movement thereof into registration so as to allow the transport to align the document to the line of the registration edge.

This registration skewing and slipping allowance is however, quite inconsistent with the desired no-skewing upstream feeding of the document before it reaches the registration area 15. It is also inconsistent with the desired rapid and non-skewing downstream ejection of the document from the platen after copying of the document is completed. That is, after the document has been registered and illuminated for exposure, it is desirable that the registration edge stop 13 be lowered out of the document path by a solenoid or other suitable mechanism and that the same document transport then be usable, by itself or with limited assistence, to rapidly eject the document from the downstream edge of the platen into a suitable catch tray or the like, and also to simultaneously rapidly feed on the next document to be copied. This ejection requires rapid acceleration of the document sheet which increases potential slippage or skew problems, both for the document being ejected and for the next document being fed in at high speed at the upstream or input area of the platen.

This belt 16 may be constructed of conventional single wide white document belt materials, as described above. In fact because of the system disclosed herein, its frictional characteristics are much less critical. Further, it is intended not to require the daily cleaning and lubricating by silicone oiling or a "kyaar" pad or dusting powder conventionally provided for such belts. The mounting of the belt may be basically conventional, but with less belt tension, as will be described. However, with the present system, there is additionally provided a vacuum plenum or manifold 18. The lower surface 19 of the vacuum plenum 18 is apertured to apply a vacuum between the vacuum plenum 18 and the back of the lower flight of the belt 16. This surface 19 is a planar and preferably approximately 1 mm above the planar surface of the platen 14. However, it may be slightly curved away from the platen, i.e. or spaced by a greater distance, at the document input or upstream edge of the platen. A vacuum is selectively applied to the vacuum plenum 18 to lift the belt 16 up against the surface 19. Its vacuum is applied by conventional small vacuum blower 20 through a valve system 22 connecting between the blower and the plenum, as will be further described hereinbelow.

The belt 16 may be conventionally mounted and loosely tensioned between a downstream roller 24 and an upstream roller 26 overlying but extending beyond the respective downstream and upstream edges of the platen 14. The downstream roller 24 may be conventionally motor driven to provide the belt movement and corresponding document movement. However, unlike a conventional single belt system, the tensioning is not critical and is low. That is the belt is relaxed and under low tension so that in the absence of a vacuum applied to the vacuum plenum 18, substantially the full weight of the lower flight of the belt 16 can rest with a corresponding normal force against the back of the document 12. This is contrary to the normal mounting in which the belt tension is critical or sensitive because this belt tension must be utilized to partially counteract the belt weight to prevent excessive normal force on the document. Thus, with the present system, the maximum normal force (with no vacuum applied) is substantially higher, in fact so high as to substantially prevent document skewing and proper registration. Nor does the belt require lubricating at regular intervals after cleaning to reduce its frictional feeding force. This overcomes the known problem of adhesion between the freshly cleaned and lubricated belt and the platen which can cause a belt in effect to "stick" to the platen and have excessive starting torque especially after a long period of inactivity. With the present system, the frictional driving force, which is the function of both of the coefficient of friction and the normal force, is substantially reduced by the selective application of the vacuum and therefore the maintenance of a lower coefficient of friction is not as critical. Furthermore, the vacuum application directly lifts the belt away from the platen and thereby overcomes the abovedescribed surface adhesion effect before a startup of the belt movement by greatly reducing the contact area.

The plenum apertured surface 19, and therefore the area of applied vacuum, comprises a substantial or major area of the belt surface overlying the platen. However, an important feature disclosed herein is that selected minor areas of the belt are not lifted away from the platen toward the vacuum plenum means even when the vacuum is applied thereto. This is provided by rollers 28 and 29 within the area of the vacuum plenum 18 but extending through apertures or wheel wells 30 therein. These small rollers provide actual deformations or protuberances of the flexible and resilient belt 16 at fixed positions overlying the platen, even though the belt itself is moving past these rollers 28 and 29 during its document feeding operation. These belt protuberances engage and transport the document sheet and provide the frictional drive to the document sheet in a selective manner.

Specifically there is disclosed here a single small downstream roller 28 in the platen registration area 15. It is slightly spaced from the registration edge stop 13 in a position to engage a standard document sheet 12 being driven into registration centrally thereof in the transverse dimension of that document. The rollers 29 are a transversely spaced pair of rollers overlying the upstream or input area of the platen. They provide two transversely spaced areas of belt contact with a document being fed onto the platen for positively feeding the document with two small areas of high normal force sufficiently transversely spaced apart to prevent skewing of the document relative to the belt. These rollers 29 are spaced sufficiently far upstream so that a normal sized document is released from the nips under these upstream rollers 29 before the lead edge of the document reaches registration against the edge stop 13. Thus for the last (registration and deskewing) portion of the document movement across the platen, the document is primarily under the control of only the single central downstream roller 28. This roller 28 is adapted to allow some rotation of the document about its nip area deskewing the document as it is driving the document against the edge stop 13, providing a vacuum is applied therearound in the vacuum plenum 18 to lift the remainder of the belt over the document up with sufficient vacuum force to allow document slippage relative to the rest of the belt.

Once the document sheet has been driven into registration with the controlled driving and slippage provided by the belt normal force control provided by the vacuum plenum 18 and the 3 rollers 28 and 29, the forward movement of the belt 16 is stopped and the vacuum is removed from the vacuum plenum 18 by the valve system 22. In fact this removal of vacuum may be initiated slightly before registration is achieved, since a finite time is required for the belt release. Upon the removal of the vacuum, the full weight of the belt 16 is applied over the entire belt surface overlying the document. This provides a flattening or clamping of the document against the platen to assist in its proper exposure. I.e. to insure that all of the document is within the depth of field of the copier optics under the platen, by removing document wrinkles or curls, etc.. After the document exposure imaging is completed, by any suitable imaging system, such as a scanning lamp or flash illumination, the document is then ejected automatically from the platen for the copying of the next document sheet. For this document ejection the vacuum is not reapplied. That is, the full normal force weight of the belt is maintained on the document sheet to assist in the ejection of the document by increasing the total feeding force and also greatly increasing the area of contact between the belt and the document sheet, as compared to the input feeding cycle in which the vacuum was applied. This also prevents skewing on ejection and thus aids in restacking. As the belt is accelerated to eject the document sheet from the platen the vacuum is then automatically reapplied to the belt for the feeding of a subsequent document sheet over the platen. This relifting of the belt at the input area also provides a gap between the belt and the platen there which assists in the insertion of the document sheet as well as reestablishing the two discrete input feeding areas under the two upstream rollers 29.

Referring further to the rollers 28 and 29, they are provided with either gravity loading from their weight or the weights of their mounting components and/or a downward spring loading. This provides sufficient force so that a vacuum applied to the plenum apertured surface 19 to the rest of the belt surface will not lift the belt in the areas under these rollers. That is, the downward normal force of these rollers is sufficient for their area to counteract the vacuum force and deform the belt in their area and maintain a nip between each roller and the platen surface. The axes or mounting shafts of the rollers may be loosely mounted in vertical slots to effectively allow the rollers to float vertically with respect to the rest of the platen cover unit and therefore eliminate any criticality of alignment with the platen or any criticality of the positioning of the rollers 24 and 26 relative to the platen.

The document handler 10 and its transport system provides the advantages of an unapertured wide belt transport system without many of its disadvantages. That is, the belt 16 provides a completely uniform light reflective background for the document imaging which has no show-through or show-around problems. Yet a variable force and selectively controlled transport and registration system is provided in which both the applied areas of the belt and the applied normal force are selectively controlled for providing both non-slip feeding of the document during infeeding and ejection, yet providing the desired slip conditions between the belt and the document as the document is being registered. When the vacuum is applied, the document feeding is under the control of the small minor areas of the belt underlying the rollers 29 or the roller 28, depending on the document position. The rest of the belt is lifted either partially or entirely out of contact with the document and the platen. This also results in a lower friction between the moving belt and the platen. Furthermore the friction between the moving document and the platen is also reduced. The document may effectively "float" in the air gap between the belt and the platen as it is driven across the platen by the roller nip contacts of rollers 29, and then of roller 28, with the primary document normal and driving force being only that locally applied by these rollers.

The plenum apertured surface 19 against which the belt is pulled by the applied vacuum may be coated with any suitable solid or other lubricant material. The back of the belt, which rides against the surface 19, may likewise be either formed or treated to have a low friction surface, since neither of the latter two surfaces are utilized for either document transport or imaging background.

The outer surface of belt 16 overlying the platen, even though it is a uniform and unapertured surface, actually functions in two different modes as if it were two different types of document transport. When the vacuum is applied, the belt in effect acts as three spaced frictional rollers engaging the document rather than as a belt. In contrast, when the vacuum is removed, the belt acts as a heavy, document flattening, high normal force, friction belt.

Further features may be provided with the present system. The valve system 22 and its connection to the vacuum plenum 18 may be through plural, dual mode vacuum/pressure valves V and V', as shown rather than through a single vacuum cutoff or dump valve. That is, the vacuum plenum 18 may be divided into two or more separate plenums to which either vacuum or pressure may be selectively separately applied. Here this is illustrated by dividing the vacuum plenum 18 into an upstream portion 42 and a downstream portion 44 respectively, connected individually through solenoid controlled valves V' and V to the vacuum or pressure side outputs of blower 20. Applying pneumatic air pressure instead of a vacuum to the vacuum plenum 18 is an additional feature which may be provided to even further increase the belt normal force and its document flattening effect for document exposure and/or ejection, if desired. A lip seal may be provided on the plenum surface 19 between the two plenum portions 42 and 44 to assist in simultaneous respective application of pressure and vacuum as discussed below. A further feature which may be provided is a conventional vertically repositionable ejection normal force or kicker roller 40 which may be pressed into the back of the belt over the registration edge stop 13 to prevent the document from escaping between the belt 16 and the edge stop 13 during registration, and to assist in document ejection when the registration edge stop is lowered out of the document path. The registration edge 13 may be segmented with spaced fingers to interdigitate with corresponding grooves in the roll 24 (corrugated to match) for further registration assurance.

All of these components may of course be conventionally actuated through the conventional copier controller 100 at the appropriate times. The separation of the vacuum plenum 18 into separate areas allows further sophistication of the control system. That is, a vacuum may be applied over the entire upstream portion of the belt through the plenum portion 42 for the infeeding of a subsequent document at the same time as the vacuum is removed (or a pressure applied) to the downstream plenum portion 44 for ejection of the preceding document simultaneously therewith with maximum normal force and contact area. This is useful for the sequential stream feeding of documents to be copied in rapid succession where the belt 16 is utilized to feed onto the platen a subsequent document at the same time as it is ejecting the preceding document from the platen. That is, vacuum may be applied first to only the upstream half of the belt area and then to the entire belt area and then to none of the belt area and then again to only the upstream area, etc..

While not illustrated herein, it will be appreciated that a simple solenoid or other mechanism may be utilized to provide retraction at appropriate times of the rollers 28 and/or 29, as desired. This could be utilized, for example, in a system cited in the above art, wherein, unlike the system here, the registration edge is fixed and at the upstream edge of the platen, and the document movement is reversed by a brief reversal drive of the belt to back the trail edge of the document sheet into registration. In that type of system it may be desirable to lift one or both of the rollers 29 briefly during this reverse movement of the belt for assisting registration slip and maximizing deskewing, in coordination with the vacuum lifting of the belt during this registration operation.

It will be appreciated that there are a number of other advantages provided by the present system in addition to those described hereinabove. For example, because of the reduced contact areas during most of the belt movement between the document paper and the platen glass, as well as between the belt and the platen glass, and between the belt and the document, wear and contamination and static electricity generation and adhesion therefrom may be reduced. The belt thickness may be reduced because of the lower tension. A simpler mounting arrangement for the rollers 24 and 26 may be provided since the spacing therebetween for belt tensioning is not critical. The solid fixed vacuum plenum surface 19 provides a solid surface against which the belt may be pressed for cleaning the belt when the platen cover unit is lifted. Reduced drive torque, especially on startup of the system after overnight shutdown, may be provided. The tolerance of the system to thinner, lighter weight or more delicate documents may be improved. The belt surface texture and condition is not as critical, particularly as to its frictional characteristics. The registration nip roll or kicker roller 40 is not as critical, and may be retracted or completely eliminated, yet still allowing light-weight document handling capability to be improved.

The embodiment disclosed herein, and others, are intended to provide a more positive and reliable yet gentle and automatic control of the driving and registration forces on the document sheet during the entire process of feeding, registering, deskewing, and ejecting the document. It will also be appreciated that the embodiment described herein is merely exemplary and that other variations, modifications, refinements, or alternative embodiments may be made by those skilled in the art from this teaching. They are intended to be encompassed by the following claims.

What is claimed is:

1. In a document transport for transporting document sheets over a copier platen and into a registration position thereon for copying with a single, light reflective, flexible, unapertured and air impervious wide frictional movable belt providing a uniform light imaging background for the document sheet, the improvement comprising:
selectably actuatable vacuum means for selectably applying a vacuum to vacuum plenum means overlying said vacuum belt above said platen,
said vacuum means lifting all but selected minor areas of said belt away from said platen toward said vacuum plenum means when a vacuum is applied to said vacuum plenum means,
said vacuum plenum means allowing said belt to drop from said vacuum plenum means into engagement with a document sheet on the platen over a much larger area of said belt when said vacuum is removed from said vacuum plenum means as compared to when said vacuum is applied to said vacuum plenum means, and
belt deforming means for deforming said minor areas of said belt away from said vacuum plenum means towards said platen for selective area driving of a document sheet on the platen with said deformed minor areas of said belt when said vacuum is applied to said vacuum plenum means.

2. The document transport of claim 1 wherein said belt deforming means comprises rollers deformably engaging said selected minor areas of said belt for deforming said belt into driving engagement with a document sheet being transported across said platen while other areas of said belt are lifted out of engagement with the document sheet by said vacuum applied to said vacuum plenum means.

3. The document transport of claims 1 or 2 wherein said vacuum plenum means and said belt are adapted to allow said belt to non-deformably planarly overly and engage a document sheet when said vacuum is removed from said vacuum plenum means.

4. The document transport of claims 1 or 2 wherein said belt is lifted away from said platen by approximately 0.25 to 1 millimeter except in said selected minor areas when said vacuum is applied to said vacuum plenum means.

5. The document transport of claims 1 or 2 wherein said belt is an endless loop with upper and lower flights and said vacuum plenum means comprises a fixed generally planar vacuum surface member mounted inside said endless loop and overlying said second flight.

6. The document transport of claims 1 or 2 wherein said vacuum plenum means is apertured for said belt deforming means and said belt deforming means extend through said apertures.

7. The document transport of claims 1 or 2 further including pressure roller means engaging the belt in said registration position.

8. The document transport of claim 5 wherein said vacuum plenum means has separate portions to which vacuum may be selectively applied.

9. The document transport of claims 1 or 2 further including means for selectively applying a positive pneumatic pressure instead of a vacuum to said vacuum plenum means.

10. A method for transporting a document sheet over a copier platen with a single wide unapertured frictional belt providing a uniform light imaging background for the document sheet comprising the steps of:
applying a vacuum lifting force over a substantial area of the back of said belt over said platen to deform said belt into a generally planar surface spaced from the document sheet with at least two belt protuberances extending towards said platen in selected minor areas of said belt,
engaging and transporting the document sheet over the platen with said deformation proturbances of said belt, and then
removing said vacuum to remove said deformation of said belt and allowing said belt to substantially planarly overly the document sheet and to greatly increase the area of contact between the belt and the document sheet.

11. The method of claim 10 wherein said belt is accelerated to eject the document sheet from the platen with said vacuum removed and then said vacuum is reapplied to said belt for the feeding of a subsequent document over the platen.

12. The method of claims 10 or 11 wherein said deformation proturbances are formed in said belt by applying mechanical pressure to the back of the belt in said selected minor areas with sufficient pressure to overcome said vacuum lifting force in said selected minor areas.

13. The method of claims 10 or 11 wherein said vacuum lifting force is selectively applied to only substantially all of the upstream half of belt area overlying the platen or to substantially the entire belt area overlying the platen.

14. The method of claims 10 or 11 including the further step of applying a pneumatic pressure to said belt.

* * * * *